United States Patent
Pedemonte

(10) Patent No.: US 7,827,978 B2
(45) Date of Patent: Nov. 9, 2010

(54) DEVICE FOR LOCKING A FRONT END OF A SHAFT IN A SPEAR GUN FOR SCUBA DIVERS

(75) Inventor: Stefano Pedemonte, Genova (IT)

(73) Assignee: Cressi-Sub S.p.A., Genova (IT)

( * ) Notice: Subject to any disclaimer, the term of this patent is extended or adjusted under 35 U.S.C. 154(b) by 430 days.

(21) Appl. No.: 11/824,143

(22) Filed: Jun. 30, 2007

(65) Prior Publication Data
US 2008/0017176 A1    Jan. 24, 2008

(30) Foreign Application Priority Data
Jun. 30, 2006    (IT) .......................... FI20060040 U

(51) Int. Cl.
*F41B 7/04* (2006.01)

(52) U.S. Cl. ............................ 124/20.3; 43/6; 124/41.1

(58) Field of Classification Search .................. 43/6; 124/20.3, 25, 41.1, 44.5
See application file for complete search history.

(56) References Cited

U.S. PATENT DOCUMENTS

| | | | | |
|---|---|---|---|---|
| 2,760,480 A | * | 8/1956 | Carroll | 124/22 |
| 3,006,330 A | * | 10/1961 | De Bach | 124/22 |
| 3,788,299 A | * | 1/1974 | Mathews | 124/35.1 |
| 4,206,740 A | * | 6/1980 | Lydon | 124/25 |
| 4,685,439 A | * | 8/1987 | Cosentino, Jr. | 124/44.5 |
| 4,722,318 A | * | 2/1988 | Yankey | 124/25 |
| 4,827,893 A | * | 5/1989 | Nishioka | 124/25 |
| 4,947,822 A | * | 8/1990 | Jones, et al. | 124/41.1 |
| 5,062,406 A | * | 11/1991 | Robertson | 124/25 |
| 5,611,323 A | * | 3/1997 | Townley | 124/44.5 |
| 5,697,356 A | * | 12/1997 | Chappell | 124/44.5 |

* cited by examiner

*Primary Examiner*—John Ricci
(74) *Attorney, Agent, or Firm*—Pollack, P.C.

(57) ABSTRACT

A device is provided for locking a front end of a spear shaft in a spear gun. The device comprises a bridge extending crosswise over a distal end of the gun with a substantially U-shaped nosepiece joined to the distal end and revolving relatively freely about a crosswise axis thereof. The nosepiece includes at least two arms connected to respective ends of a relatively elastic cable that may be tensioned against a rear end of the shaft, when the shaft is placed on a support surface along the body of the gun. The bridge is attached to and integrally with the ends of the elastic cable and is located a selected distance from the support surface such that the shaft is retained against the surface when the spear is in a stowed or loaded position.

4 Claims, 1 Drawing Sheet

DEVICE FOR LOCKING A FRONT END OF A SHAFT IN A SPEAR GUN FOR SCUBA DIVERS

FIELD OF THE INVENTION

The present invention relates generally to aquatic activities and, more particularly, to weapons for use in scuba diving and the like.

BACKGROUND OF THE INVENTION

In conventional aquatic hunting activities, for instance, where the weapon of choice is typically a spear gun, various devices have been developed to hold a front end of the spear shaft in a selected position at a distal end of the gun until the trigger is pulled and the spear is launched towards the intended prey.

In one such device, the distal end of the gun mounts a fixed bridge defining an axial seat for engaging the spear shaft. The spear shaft remains in position until the gun is fired, despite any movement by the scuba diver. A metal bar substantially in the form of a U-shaped arch, commonly referred to as a nosepiece, is also provided. The bar is attached to the distal end of the gun, the U-shaped arch having its open end facing a proximal end of the gun. The arch can rotate freely about the distal end, the two arms of the arch being attached to the ends of an elastic cable, typically made of rubber, which is first tensioned and then released to launch the spear shaft. Since the ends of the cable are secured to the nosepiece arms, which are free to rotate about the distal end of the gun, the nosepiece lifts away from the gun when the cable is released, and, thereby, avoids obstructing the sliding motion of the spear shaft.

While useful, such systems have been found disadvantageous in that they allow a degree of slack for the spear shaft inside the bridge, which slack often prevents the scuba diver from taking accurate aim. In an effort to overcome this drawback, a simplified version of the arrangement has also been developed, such version having the bridge at the distal end of the gun, whereas the ends of the elastic cable are connected directly, in a fixed position, to either side of the distal end.

In yet a further conventional arrangement, no bridge is provided and the front end of the spear shaft is held in position by a rope attached to the spear. The rope typically passes crosswise over the spear shaft, holding it against the end of the gun. Although this device provides considerable structural simplicity as compared to prior spear gun systems, such benefits are far outweighed by the disadvantage that the scuba diver must adopt a more complicated procedure to load the gun.

Hence, by conventional wisdom, if a bridge is provided that facilitates the procedure for loading a spear, then the end of the spear shaft must be held in place by the bridge using an unavoidable degree of slack which, in turn, reduces the accuracy of a diver's aim, should the diver change position. If, on the other hand, the nosepiece is eliminated, then it becomes considerably more complicated to load the spear.

In accordance with another aspect of the present invention, there is provided a device for locking a front end of a spear shaft in a spear gun for scuba divers. The device comprises a bridge-shaped element extending crosswise over a distal end of the gun with a substantially U-shaped nosepiece connected to the distal end and revolving freely about a crosswise axis thereof. The nosepiece has a plurality of arms joined respectively to ends of a relatively elastic cable that is tensioned against a rear end of the shaft, when the shaft is placed on a support surface along the body of the gun. Also, the bridge element is attached to and integrally with the ends of the elastic cable and is at a distance from the support surface such that the shaft is retained against the surface when the spear is in a stowed or loaded position. In addition, the ends of the elastic cable are connected to corresponding terminal bushings attached to and integrally with the arms of the nosepiece, the bridge element being affixed to the bushings and extending crosswise from one to the other.

According to a further aspect of the present invention, a device is provided for locking the front end of the spear shaft in a spear gun for scuba divers. The device includes bridge-shaped element extending crosswise over a distal end of the gun; and a substantially U-shaped nosepiece joined to the distal end and revolving freely around a crosswise axis thereof. The nosepiece comprises a plurality of arms joined respectively to the ends of a relatively elastic cable that is tensioned against a rear end of the shaft, when the shaft is placed on a support surface along the body of the gun. Additionally, the bridge element is attached to and integral with the ends of the elastic cable and is at a distance from the support surface such that the shaft is retained against the surface when the spear is in a stowed or loaded position.

OBJECTS AND SUMMARY OF THE INVENTION

Accordingly, it is an object of the present invention to provide a device for a spear gun which locks a front end of a spear shaft so as to eliminate slack inside the bridge at the distal end of the shaft and, thereby, allow the scuba diver to take accurate aim.

According to one aspect of the present invention, a locking device is provided for a front end of a spear shaft for a spear gun. The device preferably comprises a bridge-shaped element extending generally crosswise over a distal end of the gun with a substantially U-shaped nosepiece joined to the distal end such that the device may revolve freely about a selected crosswise axis. The nosepiece desirably includes a plurality of arms joined respectively to ends of a relatively elastic cable that may be tensioned against a rear end of the shaft, when the shaft is placed on a support surface along the body of the gun. The bridge element is attached to and integrally with the ends of the elastic cable, which is at a selected distance from the support surface such that the shaft is retained against the surface when the spear is in a stowed or loaded position relative to the gun.

BRIEF DESCRIPTION OF THE DRAWINGS

A specific, illustrative locking device for a spear gun, according to the present invention, is described below with reference to the accompanying drawings, in which.

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
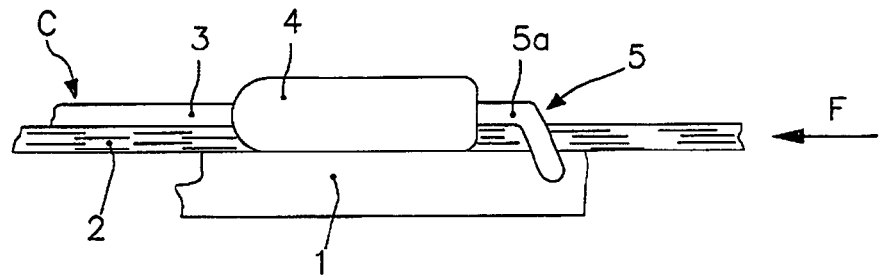
FIG. 1 is a schematic side view of a spear gun for scuba divers showing a locking device, at a distal end of the gun, according to one aspect of the present invention.
Figure 2:
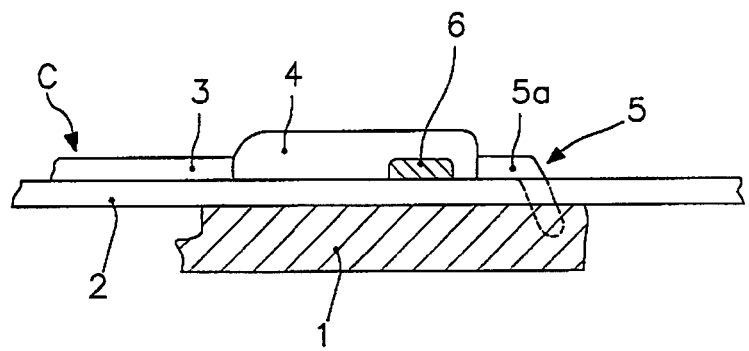
FIG. 2 is a sectional view, taken longitudinally, of the distal end of the gun illustrated in FIG. 1.
Figure 3:
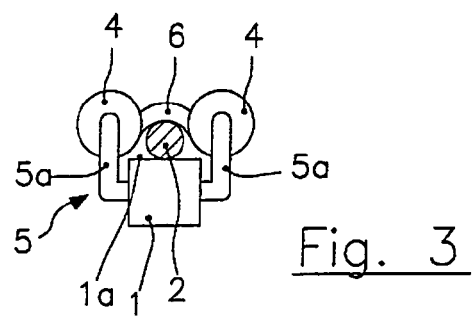
FIG. 3 is a front view of the gun set forth in FIG. 1, taken in the direction of arrow F, showing a spear in a stowed or loaded position.

Referring now to the drawings and, more particularly, to FIGS. 1-4, there is shown generally a specific, illustrative locking device for a spear gun, according to various aspects of the present invention. In one embodiment, illustrated schematically in FIG. 1, a spear gun for scuba divers is provided, the gun having a distal end 1 and a spear shaft 2 mounted at the distal end. One of two ends 3 of a relatively elastic cable C that extends along the gun body is maintained under tension through engagement with a tooth at a rear portion of the spear shaft. By using a bushing 4, each end 3 of the cable is joined axially to an arm 5a of a nosepiece 5 preferably having a relatively slender metallic arch mounted revolving/rotatably and crosswise in relation to distal end 1 of the gun.

Figure 4:
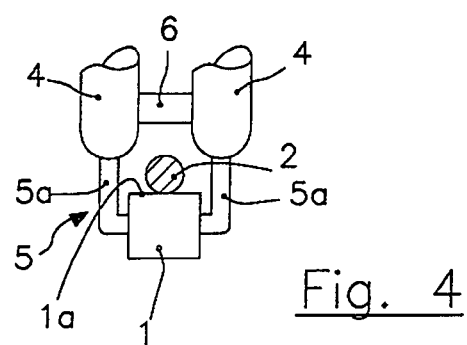
FIG. 4 is a front view of the gun shown in FIG. 1, taken in the direction of arrow F, with a spear in an operative position—immediately after firing, before the spear has become detached from the gun.

A bridge 6 is attached integrally to and in a crosswise position between bushings 4. The distance between the bridge and a support surface 1a for supporting the shaft at distal end 1 is such that, when the spear is in a loaded position in the gun, the bridge holds the shaft's distal end against the gun so as to prevent movement of the shaft. In other words, the distance between the bridge and the support surface is generally equal to the diameter of the shaft, such that when the spear is in the loaded position, the underside of bridge 6 bears against the shaft, holding it in a selected position against the gun's support surface, even if the scuba diver moves prior to firing the gun. An arrangement of this general description is shown, for example, in FIG. 3. When the gun is fired, elastic cable C lifts away, together with bushings 4 at its ends and bridge 6 attached integrally thereto. As illustrated in FIG. 4, when the bridge is lifted away, it releases the spear shaft, which is, in turn, launched unobstructed towards the intended prey.

Overall, in providing a bridge integrally with a nosepiece such that they rotate together once the tensioned elastic cable has been released, slack inside the bridge at the distal end of the spear shaft is eliminated, thereby allowing the scuba diver to take accurate aim. Moreover, this rotation increases the cross-section of the space where the spear shaft passes, thus permitting the shaft to slide freely when it is fired. When in a loaded position, on the other hand, the bridge abuts the spear shaft, thereby retaining it in a fixed position even if the diver moves prior to firing the gun.

Various modifications and alterations to the invention may be appreciated based on a review of the disclosure. These changes and additions are intended to be within the scope and spirit of the invention as defined by the following claims.

What is claimed is:

1. A device for locking a front end of a spear shaft in a fishing gun for scuba divers, comprising a bridge-shaped element extending crosswise over a distal end of the gun with a substantially U-shaped nosepiece connected to the distal end and revolving freely about a crosswise axis thereof, the nosepiece comprising a plurality of arms joined respectively to ends of a relatively elastic cable that is tensioned against a rear end of the shaft, when the shaft is placed on a support surface along the body of the gun, wherein the bridge element is attached to and integrally with the ends of the elastic cable and is at a distance from the support surface such that the shaft is retained against the surface when the spear is in a stowed or loaded position.

2. The locking device set forth in claim 1, wherein the distance between the bridge element and the support surface is generally the same as the diameter of the shaft.

3. A device for locking a front end of a spear shaft in a fishing gun for scuba divers, comprising a bridge-shaped element extending crosswise over a distal end of the gun with a substantially U-shaped nosepiece connected to the distal end and revolving freely about a crosswise axis thereof, the nosepiece comprising a plurality of arms joined respectively to ends of a relatively elastic cable that is tensioned against a rear end of the shaft, when the shaft is placed on a support surface along the body of the gun, wherein the bridge element is attached to and integrally with the ends of the elastic cable and is at a distance from the support surface such that the shaft is retained against the surface when the spear is in a stowed or loaded position, wherein the ends of the elastic cable are connected to corresponding terminal bushings attached to and integrally with the arms of the nosepiece, the bridge element being affixed to the bushings and extending crosswise from one to the other.

4. A device for locking a front end of a spear shaft in a fishing gun for scuba divers, comprising:
   a bridge-shaped element extending crosswise over a distal end of the gun; and
   a substantially U-shaped nosepiece joined to the distal end and revolving freely around a crosswise axis thereof;
   the nosepiece comprising a plurality of arms joined respectively to the ends of a relatively elastic cable that is tensioned against a rear end of the shaft, when the shaft is placed on a support surface along the body of the gun;
   wherein the bridge element is attached to and integral with the ends of the elastic cable and is at a distance from the support surface such that the shaft is retained against the surface when the spear is in a stowed or loaded position.

* * * * *